United States Patent [19]

Sato

[11] 4,268,949
[45] May 26, 1981

[54] TRACING MILLING MACHINE

[75] Inventor: Makoto Sato, Aikawamachi, Japan

[73] Assignee: Makino Milling Machine Co., Ltd., Tokyo, Japan

[21] Appl. No.: 81,648

[22] Filed: Oct. 4, 1979

[51] Int. Cl.³ .................... B23Q 3/157; B23C 1/16
[52] U.S. Cl. .................................. 29/568; 408/6; 409/99; 409/121
[58] Field of Search .................. 29/568; 408/3, 6; 409/98, 99, 121, 141

[56] References Cited

U.S. PATENT DOCUMENTS

| 2,213,959 | 9/1940 | Garrison et al. | 409/98 |
| 3,344,512 | 10/1967 | Zucchellini | 29/568 |
| 3,548,172 | 12/1970 | Centner et al. | 408/3 X |

Primary Examiner—Z. R. Bilinsky
Attorney, Agent, or Firm—McAulay, Fields, Fisher, Goldstein & Nissen

[57] ABSTRACT

A tracing milling machine having a conventional tracing milling machine controller for controlling a servo movement of the machine is provided with a novel tracing command controller for automatically generating tracing commands to be supplied to the tracing milling machine controller for the purpose of enhancing automation of the tracing milling operation of the machine. The tracing milling machine is further provided with an automatic tool changer, for enabling an automatic tool change of a cutting tool attached to a spindle of the machine during the automated tracing milling operation of the machine.

6 Claims, 3 Drawing Figures

TRACING MILLING MACHINE

FIELD OF THE INVENTION

The present invention relates, generally, to an improvement in a tracing milling machine and, more particularly, the present invention relates to a tracing milling machine with a novel tracing command controller and an automatic tool changer, whereby automated machining of a product having a complicated shape, such as a male or female metal mold, can be carried out with high accuracy and at a high production efficiency.

BACKGROUND OF THE INVENTION

It is known that a tracing milling machine can be used for machining a metallic product having a shape so complicated that the dimensional indication of the shape by the use of a design drawing or drawings is impossible. For instance, a conventional tracking milling machine is widely used for machining male and female metal products. The tracing milling machine is always provided with a tracer head to which a tracer with a stylus is attached. The tracer performs a tracing movement over the surface of a template or a model, and in response to the tracing movement of the tracer, the movement of a cutting tool for carrying out the machining of the metal product from a workpiece is servo-controlled. The tracing movement of the tracer can be performed in diverse ways or modes such as, for example, a both way tracing mode, a one way scan tracing mode, a partial contour tracing mode, a 360° contour tracing mode, or a three dimensional tracing mode. However, in a conventional tracing milling machine, automation of the entire machining process of a product is incomplete. Therefore, the control of the continuous diverse tracing milling processes as well as the selection and setting of the diverse tracking modes must be carried out by employing an operating panel by which a human operator operates the tracing milling machine. Further, mechanical dog members must be employed for limiting the tracing movement of the tracer. As a result, one human operator is always needed for operating one conventional tracing milling machine. Accordingly, it is apparent that the degree of automation of the conventional tracing milling machine is incomplete as compared with that of a conventional numerically controlled machine tool or a conventional fully automated machining center. Also, with the conventional tracing milling machine, it is well known that the machining of a metal mold having a complicated male or female shape requires a long machining time, since the machining of a metal mold from a raw workpiece must undergo many processes, such as rough, intermediate and finish machining processes. Accordingly, during the entire machining process of a metal mold from a raw workpiece thereof, it is always necessary to replace the used cutting tool attached to the spindle head of the conventional tracing milling machine with a fresh cutting tool. Further, when a cutting tool attached to the spindle head is worn or broken, such worn or broken cutting tool must be replaced with a fresh cutting tool. Therefore, the demand for a so-called automatic tool changer for a tracing milling machine is increasing, since no conventional tracing milling machine is provided with an automatic tool changer. Moreover, it is obvious that if a tracing milling machine is provided with an automatic tool changer, and if the automatic tool change is appropriately performed during the rough and finish machining processes of a metal product, the efficiency of the entire tracing milling process of the metal product will be enhanced. In this regard, however, it should be noted that a tracing milling machine must also be provided with an appropriate means for automatically detecting the need for replacing a used cutting tool attached to the spindle head of the tracing milling machine with a fresh cutting tool stored in the automatic tool changer.

SUMMARY OF THE INVENTION

A general object of the present invention is to enhance the automation of the entire tracing milling process of a product conducted by a tracing milling machine, thereby reducing the manual operation required of a human operator.

Another object of the present invention is to provide a tracing milling machine which is automatically operated throughout the entire tracing milling process of a product having a very complicated shape, which process includes both rough and finish milling processes.

A further object of the present invention is to provide a novel tracing milling machine provided with both a means for automatically changing the cutting tool in the course of the machining process of a metal product from a workpiece, and a means for automatically detecting the time when the automatic tool change by the automatic tool changing means should take place.

BRIEF DESCRIPTION OF DRAWINGS

The above and other objects and features of the present invention will be apparent from the ensuing description of an embodiment of the present invention with reference to the accompanying drawings, wherein:

FIG. 1 generally illustrates the tracing movement of a tracer provided for a tracing milling machine. Generally, in a tracing milling machine, the tracer attached to the tracer head of the machine is controlled so as to perform a tracing movement over the surface of a model, and in response to the tracing movement of the tracer, the servo movement of the cutting tool for carrying out the machining of a metal product from a workpiece is controlled. As a result, when the machining of the metal product from a raw workpiece is completed, the metal product is shaped in the same or similar shape as that of the traced model. However, the shape of the product, for example, the shape of a male or female metal mold machined by a tracing milling machine is very complicated. Therefore, when the model is traced by the tracer, the tracing movement of the tracer must be carried out in diverse ways or modes such as a both way tracing mode, a one way scan tracing mode, a partial contour tracing mode, a 360° contour tracing mode, or a three dimensional tracing mode, depending upon the shape and dimensions of each of the different portions of the model. For this reason, the entire tracing milling process of a product employing a model is usually separated into a plurality of operation blocks, and in each operation block, the tracing operation which includes a three dimensional positioning operation of the tracer tracing movement, an approaching movement of the tracer toward the model, an actual tracing movement over a portion of the surface of the model in a selected tracing mode, stopping of the tracing movement of the tracer, and withdrawal of the tracer from the surface portion of the model is carried out. FIG. 1 illustrates how the tracing operation of one block is carried over to that of the subsequent block. In FIG. 1, line 1 designates a withdrawal movement of the tracer from a portion of the surface portion of a model in the Z-axis, which movement is the final operation of one block. After completion of the withdrawal of the tracer the tracer is subsequently moved along line 2 (X-direction), line 3 (Y-direction) and line 4 (Z-direction) so as to be positioned at a predetermined position of the subsequent block. After completion of the positioning of the tracer, the tracer approaches the starting point A of the tracing movement where the tracer contacts the model. Numeral 5 designates the above-mentioned approach movement of the tracer. From the starting point A, the tracer commences the tracing movement thereof in one of the diverse modes, for example, in a both way tracing mode. The tracing movement of the tracer is continued along line 6 until the tracer reaches an end point B of the tracing movement. When the tracer reaches the end point B, the tracer is moved away from the model along a line 7, and then, the tracer is moved along a line 8 (Y-direction), that is, the tracer is positioned at a subsequent predetermined position for carrying out the tracing operation of a subsequent block. In FIG. 1, lines $X_P$—$X_P$, $X_N$—$X_N$, $Y_P$—$Y_P$, and $Y_N$—$Y_N$ designate the region in which the actual tracing movement of the tracer in one of the diverse tracing modes is carried out over the surface of the model. In a conventional tracing milling machine, the above-mentioned tracing movement region is determined and limited by the employment of mechanical dog members. On the other hand, in a tracing milling machine according to the present invention, the tracing movement region is determined and limited by the employment of position information supplied by a position detector of the machine, as will be later described in more detail. $P_F$ in FIG. 1 illustrates an amount of the known pick feed during the tracing movement of the tracer. While the tracer performs its tracing movement over the surface of the model, the spindle of the body of the tracing milling machine to which a cutting tool is attached moves above a workpiece so that the tracing milling of the workpiece into a product having the same shape as that of the model is achieved by the cutting tool. With the tracing milling process of the workpiece by the tracing milling machine, rough, intermediate, and finish milling processes are respectively performed in a manner similar to the conventional milling process of a milling machine. In this case, irrespective of any of the rough, intermediate, and finish milling processes, the cutting movement of a cutting tool is controlled by the tracing movement of the tracer. However, the amount of cutting done by the cutting tool during the rough milling process is chosen so as to be larger than the amount of cutting done during the intermediate or finish milling process, so that the entire machining efficiency of the tracing milling machine is enhanced. An increase in the cutting amount of the cutting tool attached to the spindle of the tracing milling machine is achieved by increasing the reference displacement of the tracer during the tracing movement of the tracer.

Referring now to FIG. 2, which schematically illustrates a tracing milling machine embodying the present invention, reference numeral 10 generally designates a tracing milling machine with an automatic tool changer. The machine 10 is provided with a generally vertical machine body 11 and a horizontal work table 17. The machine body 11 is provided with a spindle head 23 and an arm 24, which are both movable together up and down along a vertical column 25 in response to a forward and a reverse drive of a vertical feed motor 22. The spindle head 23 has a spindle 12 to which one of the cutting tools ($T_0$ through $T_n$) is attached, the spindle 12 being vertically slidable in a quill 13. The spindle 12 can be clamped after adjusting the vertical position of the spindle 12 with respect to the quill 13 and, after the clamping, the spindle 12 can be rotated at a desired rotational speed by a spindle drive motor 14, which receives a drive signal from a controller 15. The spindle 12 can be gradually slid by the manual operation of a handle 21 or the automatic drive of a drive motor 16, such as a stepping motor, with respect to the quill 13. Therefore, it is possible to effect the vertical positioning of the cutting tool $T_0$ (or one of the tools $T_1$ through $T_n$) which is attached to the spindle 12 with respect to a workpiece W mounted on the work table 17. On the work table 17, the workpiece W and a model M are mounted in a clamped state, respectively. The work table 17, having thereon the workpiece W and the model M, is horizontally movable in the X-axis direction and the Y-axis direction, and is also vertically movable in the Z-axis direction. The work table 17 is moved in the X-axis, Y-axis and Z-axis directions by a drive motor assembly (In FIG. 2, X-axis motor 18 and Z-axis motor 19 are exemplarily illustrated.), which receives a drive servo signal from a conventional tracing controller 51.

Figure 1:
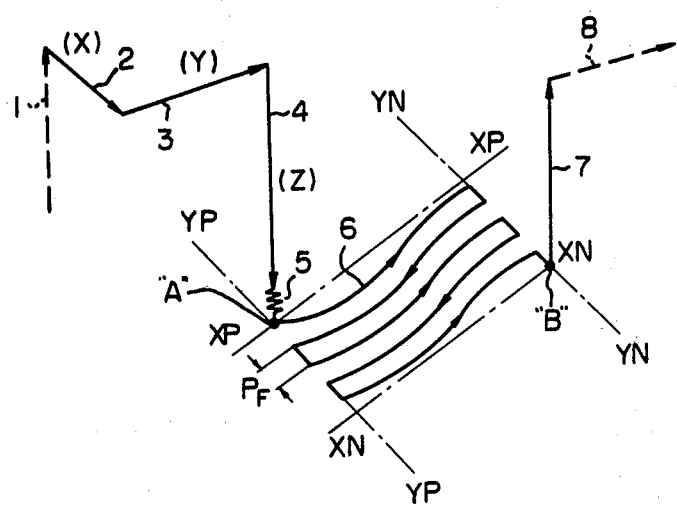
FIG. 1 is an explanatory diagram for generally illustrating the tracing movement of a tracer provided for a tracing milling machine.

Reference numeral 30 designates a tracer position which is supported by the arm 24 extending from the machine body 11, and operates so as to effect the tracing movement of the surface of the model M mounted on the work table 17. The tracer portion 30 includes a tracer 31 having a stylus capable of performing a tracing movement over the tracing surface of the model M and a tracer head 32 which generates an electric signal which indicates the amount of the tracing movement of the tracer 31. The stylus of the tracer 31 usually consists of a spherical-shape stylus capable of being displaced in a direction perpendicular to the surface over which the spherical-stylus moves. The electrical signal generated by the tracer head 32 is transmitted to the tracing milling machine controller 51 via a transmitter 32'. More specifically, in the tracing milling machine 10, while the tracer 31 of the tracer portion 30 traces over the surface of the model M, the tracer head 32 operates so as to detect a vector amount of the tracing movement or the displacement of the tracer 31 with respect to a predetermined amount of the tracer 31, i.e. a reference amount of displacement of the tracer 31 that is a set value or a reference value for the servo control of the tracing movenent of the tracer portion 30 with respect to the model M. The detected vector amount of displacement of the tracer 31 is transformed into an electrical signal and is transmitted to the tracing milling machine controller 51. Thus, the controller 51 sends to the drive motor assembly a drive servo signal in response to the transmitted electrical signal. As a result, a servo movement of the work table 17 is caused in the X-axis, Y-axis and Z-axis directions in response to the shape of the model M. During the servo movement of the work table 17, the cutting tool $T_o$ (or one of the cutting tools $T_1$ through $T_n$) attached to the spindle 12 effects the cutting of the workpiece W on the work table 17. Consequently, the workpiece W is shaped as a product having the same shape as the model M. It should be noted that the tracing milling machine controller 51 has a conventional function that is effective in transforming the vector amount of displacement of the tracer 31, detected by the tracer head 32, into the drive servo signal to be transmitted to the drive motor assembly.

Reference numerals 33, 34 and 35 designate manually operable handles used for positioning the tracer 31 of the tracer portion 30 at a predetermined position. Therefore, by the manual operation of these handles 33, 34 and 35, the tracer 31 can be positioned at a position for starting the tracing movement over the tracing surface of the model M.

The tracing milling machine 10 is further provided with a position detector assembly (In FIG. 2, only X-axis position detector 26 and Y-axis position detector 27 are exemplarily shown.) for detecting the actual positions of the work table 17 along the X-axis, Y-axis and Z-axis, with respect to the original position of the table 17. The position detector assembly generates an electric signal indicating the actual position of the work table 17. Therefore, through the detection of the actual position of the work table 17, the actual positions of the model M and the workpiece W with respect to the original position of the work table 17 can also be detected. The signal detected by the position detector assembly is supplied to a tracing command controller 50, which is operatively connected to the afore-mentioned tracing milling macine controller 51. It should be noted that the tracing milling machine controller 51 per se is the same as the controller provided for a conventional tracing milling machine, and includes a machine control portion for controlling the operation of the spindle 12 and a tracer control portion for controlling the operation of the tracer portion 30.

Figure 2:
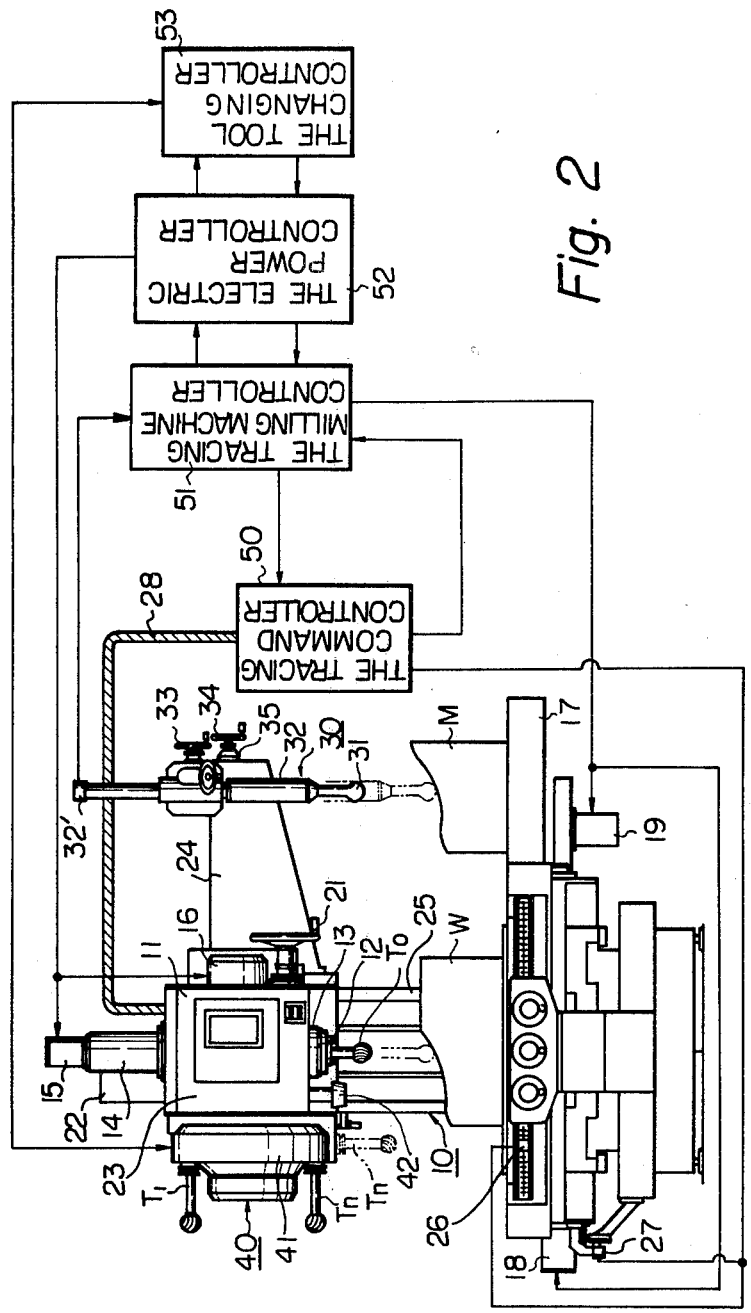
FIG. 2 is a schematic block diagram of a tracing milling machine with an automatic tool changer, according to an embodiment of the present invention.
Figure 3:
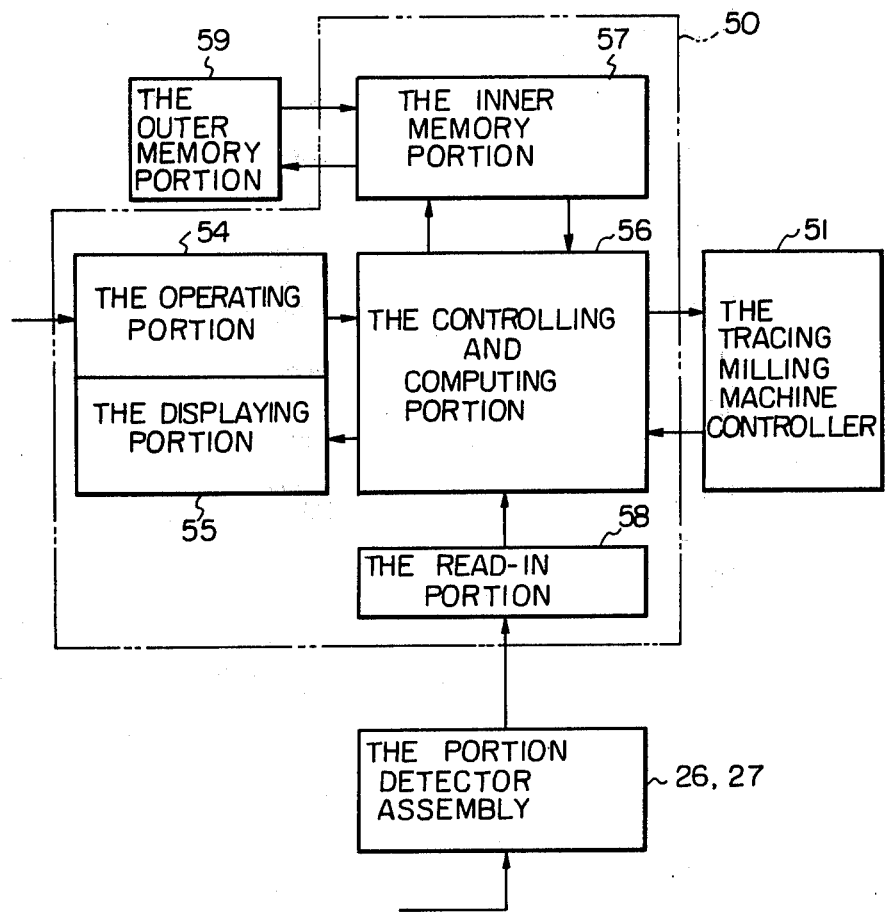
FIG. 3 is a block diagram illustrating an internal arrangement of a device for storing tracing commands and for carrying out a control operation, according to the present invention.

The tracing command controller 50, which will be described hereinafter with reference to FIG. 3, is a novel controller according to the present invention. In the embodiment illustrated in FIG. 2, the controller 50 is constructed as a pendent type device hanging from the machine body 11 by means of an arm 28.

Further, in FIG. 2, reference numeral 52 is an electric power controller which is indispendably provided for the tracing milling machine. The electric power controller 52 is connected to an electric power source (not illustrated in FIG. 2), and controls the supply of electric power to the diverse drive motors. Reference numeral 53 is a tool changing controller for controlling the tool changing operation of an automatic tool changing portion 40, which will be described hereinafter.

The construction and the operation of the tracing command controller 50 will now be described with reference to FIG. 3 which illustrates one preferred embodiment of the controller 50.

In FIG. 3, the tracing command controller 50 comprises an operating portion 54, a displaying portion 55, a controlling and computing portion 56, an inner memory portion 57, and a read-in portion 58. The operating portion 54 is a portion by which tracing signals given by an operator of the tracing milling machine 10 (FIG. 2) is transformed into electric tracing signals. The tracing signals given by the operator can be produced by manually operating the tracer 32 (FIG. 2) so that the tracer traces the surface of the model M (FIG. 2) having the shape corresponding to the desired shape of the product to be machined by the tracing milling machine. The above-mentioned manual operation of the tracer 32 is usually called a trial tracing process that is a programming process to produce tracing signals while choosing appropriate tracing modes for enabling the tracer 32 to smoothly trace the surface of the model M. The tracing signals include plural blocks of signals, if the shape of model M (FIG. 2) is complicated. Each block of signals includes an input signal indicating from what position of the surface of the model in the three-dimensional coordinate the tracer 32 (FIG. 2) should start its tracing operation including an approaching movement and a tracing movement in a given tracing mode, and also at what position of the surface of the model the tracer 32 should stop the tracing movement and start the retracting movement. Each block of signals also includes a input signal indicating at what speed the tracer 32 (FIG. 2) should perform the tracing movement. The electric tracing signals issuing from the operating portion 54 are fed into the controlling and computing portion 56. The controlling and computing portion 56 is also supplied with the position signals detected by the position detector assembly, including the position detectors 26 and 27, via the read-in portion 58. Therefore, the controlling and computing portion 56 produces a sequence of tracing command signals based upon the tracing input signals coming from the portion 54 and the position signals coming from the position detector assembly, with regard to the respective tracing operations to be performed at respective positions of the surface of the model M (FIG. 2). The controlling and computing portion 56 may be comprised of conventional read-only memories, usually called ROMS, which are provided with necessary controlling and computing functions. The tracing command signals produced at a high speed by the controlling and computing portion 56 are usually supplied into the inner memory portion 57 so that the signals are stored by the portion 57. That is, the inner memory portion 57 has the function thereof to store a large amount of tracing command signals. Therefore, if a number of products should be machined by the tracing milling machine by employing the same model, the tracing command signals stored in the inner memory portion 57 are repeatedly read out and used for attaining the tracing milling operation of the desired number of products by the tracing milling machine. The inner memory portion 57 may be comprised of one or a plurality of conventional random access memories (RAM), or may be comprised of magnetic core memories. The tracing command signals stored in the inner memory portion 57 are sequentially read out by the above-mentioned controlling and computing portion 56 at requisite times, and are sent to the tracing milling machine controller 51. At this stage, it should be noted that the controlling and computing portion 56 is connected to the tracing milling machine controller 51 so that signals indicating an alarm condition and an operation completion condition of the tracing milling machine 10 (FIG. 2) are supplied from the controller 51 to the portion 56. Therefore, the controlling and computing portion 56 operates so as to supply the above-mentioned tracing command signals to the tracing milling machine controller 51 while taking such alarm signals and operation completion signals into consideration. The read-in portion 58 is arranged so as to transmit the position signals coming from the position detector assembly to the controlling and computing portion 56. However, if the position signals are analogue signals, the read-in portion 58 functions so as to convert the analogue signals into digital signals before the position signals are transmitted to the controlling and computing portion 56. The read-in portion 58 also has the function to change the position signals coming from the position detector assembly into absolute value signals, as required, before the position signals are supplied to the controlling and computing portion 56. These conversions or change of the position signals are made so that the controlling and computing operations of the portion 56 can be easily performed. Therefore, the read-in portion 58 may consist of conventional appropriate electronic elements or devices. The displaying portion 55 is connected to the controlling and computing portion 56 so as to receive the tracing command signals and the position signals from the portion 56. The received signals are displayed by the portion 55 so that the operator of the tracing milling machine is able to watch these signals.

The displaying portion 55 is, therefore, comprised of conventional light emitting devices, such as light emitting diodes. Thus, when an operator of the tracing milling machine watches the displaying portion 55, the operator can visually know what part of the tracing operation is being carried out by the tracing milling machine. As a result, the operator is able to know how many blocks of the tracing milling process of the product W (FIG. 2) have been completed. In addition, the displaying portion 55 can be used for enabling the operator to visually inspect or check whether or not the tracing signals given by him to the operating portion 54 are correct. Further, the embodiment of FIG. 3 illustrates that the operating portion 54 and the displaying portion 55 are preferably juxtaposed so that the operator can simultaneously perform the impression of the tracing signals into the operating portion 54 and inspect the accuracy of the impressed tracing signals through watching the displaying portion 55. Accordingly, the operating portion 54 is preferably comprised of operating keys and operating switches, and is constructed so as to be arranged on a common panel with the displaying portion 55, which is comprised of displaying elements such as light emitting elements.

The outer memory portion 59 is a memory means that is connectable to the inner memory portion 57 of the tracing command controller 50. The outer memory portion 59 may be comprised of, for example, magnetic tape devices, and is used for storing the tracing commands when the tracing commands are supplied from the inner memory portion 57. Thus, the tracing commands stored by the outer memory portion 59 can be used in such a manner as described hereinafter.

The tracing commands stored in the inner memory portion 57 are usually erased after the tracing milling of the desired number of products on the basis of a single model M is completed by the tracing milling machine 10. Therefore, if a further number of products should be machined with the same model M by the tracing milling machine 10, the outer memory portion 59 is connected to the inner memory portion 57, and the tracing commands stored by the outer memory portion 59 are returned from the portion 59 to the portion 57. Thereafter, the model M is again mounted on the tracing milling machine 10, and the tracing milling of a further number of products can be carried out by the tracing milling machine 10.

From the foregoing description, it will be understood that the provision of a tracing command controller for a tracing milling machine, according to the present invention, enables automatic computing and storing of the entire tracing commands with regard to a given model, if the supply of the tracing signals is performed a single time by an operator of the tracing milling machine. Therefore, due to the usage of the once stored tracing commands, the entire process of the tracing milling of a product from a raw workpiece can be automatically carried out. As a result, compared with the conventional tracing milling machine whereby an operator of the machine must supply the tracing signals in response to the proceeding of the tracing milling process of each product, automation of the tracing milling process can be remarkably enhanced according to the present invention. Further, if the programming of the entire tracing milling process including a rough milling process, an intermediate milling process and a finish milling process is produced in relation to the position of the work table of the tracing milling machine, and if the tracing signals include changing signals of the cutting amount by the cutting tool as well as of the pick-feed amounts, the entire tracing milling process ranging from the rough milling process to the finish milling process can be completely automated. In this case, the controlling and computing portion 56 is preferably provided with a function to adjust the displacement amount of the tracer, so that the change in the cutting amount of the cutting tool in the rough, intermediate and finish milling processes is achieved by the adjustment of the displacement amount of the tracer.

It should be noted that the above-mentioned controlling and computing portion 56 of the tracing command controller 50 may be comprised of a conventional micro computer device which is commercially available. In fact, if such commercially available micro computer device is employed, the manufacturing cost for the tracing milling machine per se, according to the present invention, can be low.

Referring again to FIG. 2, the tracing milling machine 10 is also provided with an automatic tool changer portion 40 which is mounted on the side of the vertical machine body 11 and a tool change controller 53 for controlling the tool changing operation of the automatic tool changer portion 40. The automatic tool changer portion 40 has a tool magazine 41 for storing therein cutting tools $T_O$ through $T_n$. The tool magazine 41 is constructed so as to be rotatable about a horizontal axis, and is provided with a transfer means for effecting the transfer of one of the cutting tools $T_O$ through $T_n$, for example, a cutting tool $T_n$, from the storing position within the magazine 41 to a tool changing position. The cutting tool $T_n$, illustrated by the dotted lines in FIG. 1, is positioned at the tool changing position, while the cutting tool $T_n$, illustrated by the solid lines, is positioned at the storing position within the tool magazine 41. The cutting tool $T_n$ transferred to the tool changing position is replaced by a used cutting tool attached to the spindle 12, for example a cutting tool $T_O$. The replacement of the tool $T_n$ by the used cutting tool $T_O$ is effected by means of a conventional tool changing arm 42. That is, the tool changing arm 42 has, on its both ends, conventional tool gripping pawls, and is capable of rotating about a vertical axis as well as capable of moving up and down. As a result, when the tool gripping pawls grip both tool $T_O$ and $T_n$ and when the pawls move downwardly, the used cutting tool $T_O$ can be withdrawn from the spindle 12 and the cutting tool $T_n$ (a fresh cutting tool) can be withdrawn from the tool magazine 41. Therefore, the tool changing arm 42 is rotated 180 degrees, and then, the arm 42 is returned upwardly so that the fresh cutting tool $T_n$ is attached to the spindle 12 and so that the used cutting tool $T_O$ is moved back to the storing position in the tool magazine 41. Thus, the tool changing operation is completed. The above-described tool changing operation is started in the same way as in the case of the conventional machining center with an automatic tool changer. That is, when the used cutting tool $T_O$, attached to the spindle 12, should be replaced with a fresh cutting tool $T_n$, the tool changing controller 53 sends a signal indicating the starting of the tool changing operation to the automatic tool changer portion 40. When the tool changing operation is completed, the automatic tool changer portion 40 sends a signal indicating the completion of the tool changing operation to the tool changing controller 53. Therefore, the tool changing controller 53 in turn sends the completion signal to the tracing milling machine controller 51. As a result, the tracing milling operation of the machine 10 is started with the replaced fresh cutting tool $T_n$.

As one of the important features of the present invention, the need for replacing a used cutting tool with a fresh cutting tool is detected by means of the tracer portion 30, and the tracer portion 30 sends to the tool changing controller 53, via the tracing milling machine controller 51, a signal indicating that it is time to change the used cutting tool. As described previously, in the tracing milling machine 10, while the tracer 31 of the tracer portion 30 traces over the tracing surface of the model M, the tracer head 32 detects a vector amount of the tracing movement or the displacement of the tracer 31 with respect to a predetermined reference amount of displacement of the tracer 31. Then, the detected vector amount of displacement of the tracer 31 is transformed into an electric signal and is transmitted to the tracing milling machine controller 51. Thus, the controller 51 performs the servo-control of the movement of the work table 17, on which the model M and the workpiece are mounted, in response to the transmitted electrical signal. As a result, a servo movement of the work table 17 is caused in the three directions orthogonal to one another in response to the shape of the model M. During the servo movement of the work table 17, the cutting tool $T_O$ (or one of the cutting tools $T_l$ through $T_n$) attached to the spindle 12 performs the milling of the workpiece W on the work table 17. Consequently, the workpiece W is shaped as a product having the same shape as the model M. Therefore, a predetermined positional relationship is established and is always retained between the tracer 31 of the tracer portion 30 and the cutting tool attached to the spindle 12 from the starting of the milling process of the workpiece W to the completion of the milling process. If the cutting performance of the cutting tool attached to the spindle 12 deteriorates during the milling process, there occurs an unfavorable condition in which the cutting tool cannot effect the accurate cutting operation thereof in accordance with the tracing movement of the tracer 31 over the surface of the model M. Further, if the cutting tool attached to the spindle 12 is damaged or broken during the milling process, there also occurs an unfavorable condition in which the cutting tool cannot effect the smooth cutting operation thereof. These unfavorable conditions result in an occurrence of a rough servo-control of the work table 17 and a rough milling of a product from the workpiece W. That is, if the above-mentioned unfavorable conditions occur, the vector amount of the displacement of the tracer 31, detected by the tracer head 32 of the tracer portion 30 includes therein an excessive displacement element or a vibratory element. In the present invention, therefore, the vector amount of the displacement of the tracer 31 is always inspected to determine whether or not said detected vector amount of the displacement of the tracer 31 exceeds a level predetermined for each of the cutting tools stored in the tool magazine 41. Thus, if the detected vector amount of the displacement of the tracer 31 exceeds the predetermined level, a signal is transmitted from the tracer head 32 to the tracing milling machine controller 51 via the transmitter 32' of the tracer portion 30, and the controller 51 sends to the tool changing controller 53 a signal indicating that it is time to change the cutting tool.

More specifically, in the present invention, if the tracing milling machine controller 51 detects the fact that $E-E_O$ is larger than C, where $E_O$ is the reference amount of the displacement of the tracer 31; E is the actual amount of the displacement of the tracer 31 detected by the tracer head 32, and C is the above-mentioned predetermined level, the controller 51 sends to the tool changing controller 53, via the electric power controller 52, a signal indicating that the cutting tool, which is being used, shold be replaced by a fresh cutting tool because the used cutting tool (has deteriorated worsened) in its performance or has been damaged or broken. Therefore, as described previously, the tool changing controller 53 sends a signal indicating the starting of the tool changing operation to the automatic tool changer portion 40. As a result, the automatic tool changer portion 40 starts the tool changing operation to replace the used cutting tool, which is, for example, deteriorated in its cutting performance, with a fresh cutting tool.

In the conventional tracing milling machine, the above-mentioned value of $E-E_O$ is used for controlling the cutting speed of the cutting tool. That is, when the value of $E-E_O$ exceeds a predetermined level, the cutting speed is decreased. Further, if the cutting speed is decreased by 50 percent of the initial cutting speed, an overriding signal indicating that the cutting tool is not performing normally is issued. As a result, the entire operation of the tracing milling machine is stopped to achieve a manual replacement of the cutting tool with a fresh cutting tool.

Therefore, in the present invention, it is possible to utilize the above-mentioned overriding signal as a signal indicating that the automatic tool changing operation should be started.

From the foregoing description of the embodiment of the present invention, it can be understood that since the tracing milling machine according to the present invention is provided with a novel tracing command controller and an automatic tool changer, the automated tracing milling of a product having a very complicated shape can be performed at a high production efficiency and with a high accuracy.

What is claimed is:

1. A tracing milling machine including a machine body, a vertical spindle head supporting therein a rotatable spindle to which a cutting tool is removably attached, a tracer portion having a displaceable tracer for tracing a model and a tracer head capable of issuing a signal that indicates the amount of displacement of the tracer, a movable work table on which the model and a workpiece to be machined into a product corresponding to the model are fixedly mounted, respectively, and a tracing milling machine controller for controlling a servo movement of the work table in a vertical and a horizontal direction upon being supplied with tracing commands and with the displacement amount signals of the tracer, wherein an improvement comprises a combination of:

means for issuing information that indicates the vertical and horizontal positions of said work table;

a tracing command controller for generating said tracing commands from selected tracing operation inputs and said position information, said tracing command controller being connected to said tracing milling machine controller and said position information issuing means;

an automatic tool changing means having a tool magazine for storing therein a plurality of cutting tools and a tool changing operating means for effecting the replacement of a cutting tool attached to said spindle by another cutting tool stored in said tool magazine at each tool changing time, said automatic tool changing means being attached to said machine body;

means for generating a signal indicating each of said tool changing times from said displacement amount signal issued by said tracer head, and;

a tool changing controller controlling the starting of a tool replacement operation of said automatic tool changing means in response to said tool changing time signal of said signal generating means.

2. A tracing milling machine according to claim 1, wherein said tracing command controller comprises an operating portion through which an operator of said tracing milling machine gives said selected tracing operation inputs, said operating portion converting said tracing operation inputs into corresponding tracing operation signals, a read-in portion for reading-in said position information issued from said position information issuing means and for producing corresponding position signals from said position information, an inner memory portion for storing said tracing operation signals supplied from said operating portion, and a controlling and computing portion for generating said tracing commands upon receipt of said tracing operation signals from said inner memory portion and of said position signals from said read-in portion.

3. A tracing milling machine according to claim 2, wherein said tracing command controller further comprises a displaying portion for visibly displaying said tracing commands supplied from said controlling and computing portion and said position signals supplied from said read-in portion.

4. A tracing milling machine according to claim 2, wherein said operating portion and said displaying portion are juxtaposed and are formed into a command operation panel.

5. A tracing milling machine according to claim 1, wherein said generating means of a signal indicating each of said tool changing times comprises an electric signal generating means for generating an electric signal corresponding to said signal of said each tool changing time when a vibrating level of said displacement amount signal reaches a predetermined limit for each of said plurality of cutting tool.

6. A tracing milling machine according to claim 1, wherein said generating means of a signal indicating said each tool changing time comprises a cutting control means for reducing a cutting speed of said cutting tool attached to said spindle according to said displacement amount signal issued by said tracer head, and a tool changing time signal generator for generating said signal indicating each of said tool changing times when said cutting speed is reduced to a predetermined level.

* * * * *